(12) United States Patent
Sjöberg et al.

(10) Patent No.: US 12,069,315 B2
(45) Date of Patent: Aug. 20, 2024

(54) FILM GRAIN PROCESS

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE); Davood Saffar, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 238 days.

(21) Appl. No.: 17/786,059

(22) PCT Filed: Dec. 11, 2020

(86) PCT No.: PCT/EP2020/085743
§ 371 (c)(1),
(2) Date: Jun. 16, 2022

(87) PCT Pub. No.: WO2021/122367
PCT Pub. Date: Jun. 24, 2021

(65) Prior Publication Data
US 2023/0016432 A1 Jan. 19, 2023

Related U.S. Application Data

(60) Provisional application No. 62/950,554, filed on Dec. 19, 2019.

(51) Int. Cl.
*H04N 19/85* (2014.01)
*H04N 19/172* (2014.01)
*H04N 19/174* (2014.01)
*H04N 19/70* (2014.01)

(52) U.S. Cl.
CPC .......... *H04N 19/85* (2014.11); *H04N 19/172* (2014.11); *H04N 19/174* (2014.11); *H04N 19/70* (2014.11)

(58) Field of Classification Search
CPC .......................... H04N 19/172; H04N 19/174
See application file for complete search history.

(56) References Cited

U.S. PATENT DOCUMENTS

2014/0016708 A1* 1/2014 Wang ............... H04N 19/70
375/240.25
2015/0181233 A1* 6/2015 Ramasubramonian ......................
H04N 19/463
375/240.16

FOREIGN PATENT DOCUMENTS

WO 2015009628 A1 1/2015
WO 2019040663 A1 2/2019

OTHER PUBLICATIONS

Rivaz et. al."AV1 Bitstream & Decoding Process Specification" (Year: 2019).*

(Continued)

*Primary Examiner* — Fabio S Lima
(74) *Attorney, Agent, or Firm* — Sage Patent Group

(57) ABSTRACT

A decoder can obtain a film grain model syntax element from a parameter set in a coded data representation. The decoder can determine a film grain model value by decoding the film grain model syntax element. The decoder can decode a current picture from the coded data representation. The decoder can generate an output picture by applying generated film grain to the current picture. The decoder can output the output picture.

13 Claims, 12 Drawing Sheets

(56) References Cited

OTHER PUBLICATIONS

International Search Report and Written Opinion of the International Searching Authority, PCT/EP2020/085743, mailed Mar. 26, 2021, 18 pages.
Rivaz, et al. "AV1 Bitstream & Decoding Process Specification," Codec Working Group Chair, Adrian Grange, Google LLC, The Alliance for Open Media, Jan. 8, 2019, 681 pages.
Norkin, et al. "Film Grain Synthesis for AV1 Video Codec," 2018 Data Compression Conference, Los Gatos, CA, USA, Mar. 27, 2018, 10 pages.
Boyce, et al. "Video usability information and supplemental enhancement for coded video bitstreams (Draft 2)", Joint Video Experts Team (JVET) of ITU-T SG 16 WP 3 and ISO/IEC JTC 1/SC 29/WG 11, Oct. 1-11, 2019, Geneva, Switzerland, 76 pages.
Bross, et al. "Versatile Video Coding (Draft 7)," Joint Video Experts Team (JVET) of ITU-T SG 16 WP 3 and ISO/IEC JTC 1/SC 29/WG 11, Oct. 1-11, 2019, Geneva, Switzerland, 258 pages.
Sjöberg, et al. "Mandatory film grain," Joint Video Experts Team (JVET) of ITU-T SG 16 WP 3 and ISO/IEC JTC 1/SC 29/WG 11, Jan. 7-17, 2020, Brussels, Belgium, 6 pages.

* cited by examiner

| nal_unit_header() { | Descriptor |
|---|---|
|     forbidden_zero_bit | f(1) |
|     nal_unit_type | u(6) |
|     nuh_layer_id | u(6) |
|     nuh_temporal_id_plus1 | u(3) |
| } | |

FIG. 1

| nal_unit_header() { | Descriptor |
|---|---|
|     forbidden_zero_bit | f(1) |
|     nuh_reserved_zero_bit | u(1) |
|     nuh_layer_id | u(6) |
|     nal_unit_type | u(5) |
|     nuh_temporal_id_plus1 | u(3) |
| } | |

FIG. 2

| nal_unit_type | Name of nal_unit_type | Content of NAL unit and RBSP syntax structure | NAL Unit Type Class |
|---|---|---|---|
| 0 | TRAIL_NUT | Coded slice of a trailing picture slice_layer_rbsp() | VCL |
| 1 | STSA_NUT | Coded slice of an STSA picture slice_layer_rbsp() | VCL |
| 2 | RADL_NUT | Coded slice of a RADL picture slice_layer_rbsp() | VCL |
| 3 | RASL_NUT | Coded slice of a RASL picture slice_layer_rbsp() | VCL |
| 4..6 | RSV_VCL_4.. RSV_VCL_6 | Reserved non-IRAP VCL NAL unit types | VCL |
| 7 8 | IDR_W_RADL IDR_N_LP | Coded slice of an IDR picture slice_layer_rbsp() | VCL |
| 9 | CRA_NUT | Coded slice of a CRA picture slice_layer_rbsp() | VCL |
| 10 | GDR_NUT | Coded slice of a GDR picture slice_layer_rbsp() | VCL |
| 11 12 | RSV_IRAP_11 RSV_IRAP_12 | Reserved IRAP VCL NAL unit types | VCL |
| 13 | DPS_NUT | Decoding parameter set decoding_parameter_set_rbsp() | non-VCL |
| 14 | VPS_NUT | Video parameter set video_parameter_set_rbsp() | non-VCL |
| 15 | SPS_NUT | Sequence parameter set seq_parameter_set_rbsp() | non-VCL |
| 16 | PPS_NUT | Picture parameter set pic_parameter_set_rbsp() | non-VCL |
| 17 18 | PREFIX_APS_NUT SUFFIX_APS_NUT | Adaptation parameter set adaptation_parameter_set_rbsp() | non-VCL |
| 19 | PH_NUT | Picture header picture_header_rbsp() | non-VCL |
| 20 | AUD_NUT | AU delimiter access_unit_delimiter_rbsp() | non-VCL |
| 21 | EOS_NUT | End of sequence end_of_seq_rbsp() | non-VCL |
| 22 | EOB_NUT | End of bitstream end_of_bitstream_rbsp() | non-VCL |
| 23 24 | PREFIX_SEI_NUT SUFFIX_SEI_NUT | Supplemental enhancement information sei_rbsp() | non-VCL |
| 25 | FD_NUT | Filler data filler_data_rbsp() | non-VCL |
| 26 27 | RSV_NVCL_26 RSV_NVCL_27 | Reserved non-VCL NAL unit types | non-VCL |
| 28..31 | UNSPEC_28.. UNSPEC_31 | Unspecified non-VCL NAL unit types | non-VCL |

FIG. 3

| film_grain_characteristics(payloadSize) { | Type |
|---|---|
|     film_grain_characteristics_cancel_flag | f(1) |
|     if ( !film_grain_characteristics_cancel_flag ) { | |
|         film_grain_mode_id | u(2) |
|         separate_colour_description_present_flag | u(1) |
|         if (separate_colour_description_present_flag) { | |
|             color_specific_parameters() | |
|         } | |
|         more_film_grain_parameters( ) | |
|         film_grain_characteristics_persistence_flag | u(1) |
| } | |

FIG. 8

| film_grain_params() { | Type |
|---|---|
|   if ( !film_grain_params_present \|\| (!show_frame && !showable_frame)) { | |
|     reset_grain_params() | |
|     return | |
|   } | |
|   apply_grain | f(1) |
|   if ( !apply_grain) { | |
|     reset_grain_params() | |
|     return | |
|   } | |
|   grain_seed | f(16) |
|   if ( frame_type == INTER_FRAME ) | |
|     update_grain | f(1) |
|   else | |
|     update_grain = 1 | |
|   if ( !update_grain ) { | |
|     film_grain_params_ref_idx | f(3) |
|     tempGrainSeed = grain_seed | |
|     load_grain_params( film_grain_params_ref_idx ) | |
|     grain_seed = tempGrainSeed | |
|     return | |
|   } | |
|   more_film_grain_parameters( ) | |
| } | |

FIG. 9

| seq_parameter_set_rbsp( ) { | Descriptor |
|---|---|
| ... | |
| parameter_set_film_grain_enable_flag | u(1) |
| ... | |
| rbsp_trailing_bits( ) | |
| } | |

FIG. 11

| general_constraint_info( ) { | Descriptor |
|---|---|
| ... | |
| no_film_grain_constraint_flag | u(1) |
| ... | |

FIG. 12

| seq_parameter_set_rbsp( ) { | Descriptor |
|---|---|
| ... | |
| sps_seq_parameter_set_id | u(4) |
| ... | |
| parameter_set_film_grain_enable_flag | u(1) |
| if(parameter_set_film_grain_enable_flag) | |
| film_grain_model_syntax_elements() | |
| ... | |
| rbsp_trailing_bits() | |
| } | |

FIG. 13

| adaptation_parameter_set_rbsp( ) { | Descriptor |
|---|---|
|     adaptation_parameter_set_id | u(5) |
|     aps_params_type | u(3) |
|     if( aps_params_type == 3 ) | |
|         film_grain_model_syntax_elements( ) | |
|     ... | |
| } | |

FIG. 14

| picture_header_rbsp( ) or slice_header( ) { | Descriptor |
|---|---|
|     ... | |
|     film_grain_seed | u(8) |
|     ... | |

FIG. 15

| picture_header_rbsp( ) or slice_header( ) { | Descriptor |
|---|---|
|     ... | |
|     if( parameter_set_film_grain_enable_flag ) { | |
|         film_grain_enable_flag | u(1) |
|         if( film_grain_enable_flag ) { | |
|             film_grain_parameter_set_id | u(3) |
|             film_grain_seed | u(8) |
|         } | |
|     } | |
| ... | |

FIG. 16

| parameter_set_rbsp( ) { | Descriptor |
|---|---|
| ... | |
| film_grain_seed_len_minus1 | u(4) |
| ... | |
| rbsp_trailing_bits( ) | |
| } | |

| picture_header_rbsp( ) or slice_header( ) { | Descriptor |
|---|---|
| ... | |
| film_grain_seed | u(v) |
| ... | |

FILM GRAIN PROCESS

CROSS REFERENCE TO RELATED APPLICATIONS

This application is a 35 U.S.C. § 371 national stage application of PCT International Application No. PCT/EP2020/085743 filed on Dec. 11, 2020, which in turn claims priority to United Statues Provisional Patent Application No. 62/950,554 filed on Dec. 19, 2019, the disclosures and content of which are incorporated by reference herein in their entireties.

TECHNICAL FIELD

The present disclosure relates generally to communications, and more particularly to communication methods and related devices and nodes supporting wireless communications.

BACKGROUND

High Efficiency Video Coding ("HEVC") is a block-based video codec standardized by the International Telecommunication Union-Telecommunication ("ITU-T") and the Moving Picture Expert Group ("MPEG") that uses both temporal and spatial prediction. Spatial prediction can be achieved using intra ("I") prediction from within the current picture. Temporal prediction can be achieved using uni-directional ("P") or bi-directional inter ("B") prediction on block level from previously decoded reference pictures. In an encoder, the difference between the original pixel data and the predicted pixel data, referred to as the residual, can be transformed into the frequency domain, quantized, and then entropy coded before being transmitted together with necessary prediction parameters such as prediction mode and motion vectors, which can also be entropy coded. A decoder performs entropy decoding, inverse quantization, and inverse transformation to obtain the residual, and then adds the residual to an intra or inter prediction to reconstruct a picture.

MPEG and ITU-T are working on the successor to HEVC within the Joint Video Exploratory Team ("JVET"). The name of this video codec under development is Versatile Video Coding ("VVC").

A video sequence can include a series of images where each image includes one or more components. Each component can be described as a two-dimensional rectangular array of sample values. An image in a video sequence can include three components: one luma component Y, where the sample values are luma values; and two chroma components, Cb and Cr, where the sample values are chroma values. The dimensions of the chroma components can be smaller than the luma components by a factor of two in each dimension. For example, the size of the luma component of an HD image can be 1920×1080 and the chroma components can each have the dimension of 960×540. Components are sometimes referred to as color components.

A block is one two-dimensional array of samples. In video coding, each component can be split into blocks and the coded video bitstream includes a series of coded blocks. In video coding, an image can be split into units that cover a specific area of the image. Each unit includes all blocks from all components that make up that specific area and each block belongs fully to one unit. The macroblock in H.264 and the Coding unit ("CU") in HEVC are examples of units.

A block can alternatively be defined as a two-dimensional array that a transform used in coding is applied to. These blocks can be referred to as "transform blocks." Alternatively, a block can be defined as a two-dimensional array that a single prediction mode is applied to. These blocks can be referred to as "prediction blocks." In this disclosure, the word block may not be tied to one of these definitions, instead the descriptions herein can apply to either definition.

A residual block can include samples that represent sample value differences between sample values of the original source blocks and the prediction blocks. The residual block can be processed using a spatial transform. In an encoder, the transform coefficients can be quantized according to a quantization parameter ("QP"), which can control the precision of the quantized coefficients. The quantized coefficients can be referred to as residual coefficients. A high QP value can result in low precision of the coefficients and thus low fidelity of the residual block. A decoder can receive the residual coefficients, apply inverse quantization and inverse transform to derive the residual block.

SUMMARY

According to some embodiments, a method performed by a decoder is provided. The method includes obtaining a film grain model syntax element from a parameter set in a coded data representation. The method can further include determining a film grain model value by decoding the film grain model syntax element. The method can further include decoding a current picture from the coded data representation. The method can further include generating an output picture by applying generated film grain to the current picture. The method can further include outputting the output picture.

According to other embodiments, a method performed by an encoder is provided. The method includes obtaining a film grain model syntax element from a parameter set in a coded data representation. The method can further include determining a film grain model value by decoding the film grain model syntax element. The method can further include decoding a current picture from the coded data representation. The method can further include generating an output picture by applying generated film grain to the current picture. The method can further include outputting the output picture.

According to some embodiments, a decoder is provided. The decoder includes processing circuitry and memory coupled with the processing circuitry. The memory includes instructions that, when executed by the processing circuitry, causes the decoder to obtain a film grain model syntax element from a parameter set in a coded data representation. The instructions are further executable to determine a film grain model value by decoding the film grain model syntax element. The instructions are further executable to decode a current picture from the coded data representation. The instructions are further executable to generate an output picture by applying generated film grain to the current picture. The instructions are further executable to output the output picture.

According to other embodiments, an encoder is provided. The encoder includes processing circuitry and memory coupled with the processing circuitry. The memory includes instructions that, when executed by the processing circuitry, causes the encoder to obtain a film grain model syntax element from a parameter set in a coded data representation. The instructions are further executable to determine a film grain model value by decoding the film grain model syntax element. The instructions are further executable to decode a current picture from the coded data representation. The instructions are further executable to generate an output picture by applying generated film grain to the current picture. The instructions are further executable to output the output picture.

According to other embodiments, a computer program is provided. The computer program includes program code to be executed by a decoder to obtain a film grain model syntax element from a parameter set in a coded data representation. The program code can be further executed to determine a film grain model value by decoding the film grain model syntax element. The program code can be further executed to decode a current picture from the coded data representation. The program code can be further executed to generate an output picture by applying generated film grain to the current picture. The program code can be further executed to output the output picture.

According to other embodiments, a computer program is provided. The computer program includes program code to be executed by an encoder to obtain a film grain model syntax element from a parameter set in a coded data representation. The program code can be further executed to determine a film grain model value by decoding the film grain model syntax element. The program code can be further executed to decode a current picture from the coded data representation. The program code can be further executed to generate an output picture by applying generated film grain to the current picture. The program code can be further executed to output the output picture.

According to other embodiments, a computer program product is provided. The computer program product can include a non-transitory storage medium including program code to be executed by processing circuitry of a decoder. Execution of the program code causes the decoder to obtain a film grain model syntax element from a parameter set in a coded data representation. The program code can be further executed to determine a film grain model value by decoding the film grain model syntax element. The program code can be further executed to decode a current picture from the coded data representation. The program code can be further executed to generate an output picture by applying generated film grain to the current picture. The program code can be further executed to output the output picture.

According to other embodiments, a computer program product is provided. The computer program product can include a non-transitory storage medium including program code to be executed by processing circuitry of an encoder. Execution of the program code causes the encoder to obtain a film grain model syntax element from a parameter set in a coded data representation. The program code can be further executed to determine a film grain model value by decoding the film grain model syntax element. The program code can be further executed to decode a current picture from the coded data representation. The program code can be further executed to generate an output picture by applying generated film grain to the current picture. The program code can be further executed to output the output picture.

According to other embodiments, a non-transitory computer-readable medium is provided. The non-transitory computer-readable medium can have instructions stored therein that are executable by processing circuitry to cause a decoder to obtain a film grain model syntax element from a parameter set in a coded data representation. The instructions are further executable to determine a film grain model value by decoding the film grain model syntax element. The instructions are further executable to decode a current picture from the coded data representation. The instructions are further executable to generate an output picture by applying generated film grain to the current picture. The instructions are further executable to output the output picture.

According to other embodiments, a non-transitory computer-readable medium is provided. The non-transitory computer-readable medium can have instructions stored therein that are executable by processing circuitry to cause an encoder to obtain a film grain model syntax element from a parameter set in a coded data representation. The instructions are further executable to determine a film grain model value by decoding the film grain model syntax element. The instructions are further executable to decode a current picture from the coded data representation. The instructions are further executable to generate an output picture by applying generated film grain to the current picture. The instructions are further executable to output the output picture.

Various embodiments described herein enable referencing a previous film grain model for pictures that do not use any pictures for reference and support sharing film grain model parameter values between pictures of different layers, both temporal sublayers and spatial scalability layers. Storing a single set of film grain parameters for a sequence of multiple pictures is also enabled. Some embodiments provide potential benefits that include significant bit-savings for low bitrate bitstreams where film grain models are used.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a table illustrating an example of HEVC NAL unit header syntax;

FIG. 2 is a table illustrating an example of VVC NAL unit header syntax;

FIG. 3 is a table illustrating an example of NAL unit types in VVC;

FIG. 8 is a table illustrating an example of film grain characteristics SEI message syntax in VVC;

FIG. 9 is a table illustrating an example of film grain parameters syntax in AV1;

FIG. 11 is a table illustrating an example of a film grain enable flag according to some embodiments of inventive concepts;

FIG. 12 is a table illustrating an example of no film grain constraint flag according to some embodiments of inventive concepts;

FIG. 13 is a table illustrating an example of film grain model in SPS according to some embodiments of inventive concepts;

FIG. 14 is a table illustrating an example of film grain model in APS according to some embodiments of inventive concepts;

FIG. 15 is a table illustrating an example of short seed syntax according to some embodiments of inventive concepts;

FIG. 16 is a table illustrating an example of long seed syntax according to some embodiments of inventive concepts;

DETAILED DESCRIPTION

Figure 4:
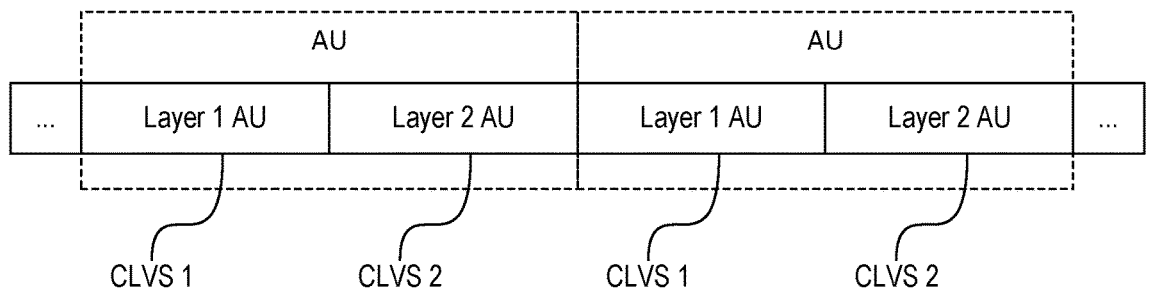
FIG. 4 is a block diagram illustrating an example of a relationship between the layer access units and coded layer video sequences.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Both HEVC and VVC define a Network Abstraction Layer ("NAL"). All the data (e.g., both Video Coding Layer ("VCL") or non-VCL data in HEVC and VVC) can be encapsulated in NAL units. A VCL NAL unit can include data that represents picture sample values. A non-VCL NAL unit can include additional associated data such as parameter sets and supplemental enhancement information ("SEI") messages. The NAL unit in HEVC can begin with a header that specifies that the NAL unit type of the NAL unit that identifies what type of data is carried in the NAL unit, the layer ID, and the temporal ID for which the NAL unit belongs. The NAL unit type can be transmitted in the nal_unit_type codeword in the NAL unit header. The type indicates and defines how the NAL unit should be parsed and decoded. The rest of the bytes of the NAL unit can be a payload of the type indicated by the NAL unit type. A bitstream can include a series of concatenated NAL units.

The syntax for the NAL unit header for HEVC is shown in FIG. 1.

The current version of the VVC draft is JVET-P2001-vE. The syntax for the NAL unit header for this current draft is shown in FIG. 2

The NAL unit types of the current VVC draft are shown in FIG. 3.

The decoding order is the order in which NAL units shall be decoded, which is the same as the order of the NAL units within the bitstream. The decoding order may be different from the output order, which is the order in which decoded pictures are to be output, such as for display, by the decoder.

In HEVC and in the VVC draft, all pictures can be associated with a TemporalId value that specifies a temporal layer to which the picture belongs. TemporalId values can be decoded from the nuh_temporal_id_plus1 syntax element in the NAL unit header. An encoder can set TemporalId values such that pictures belonging to a lower layer are perfectly decodable when higher temporal layers are discarded. Assume for instance, that an encoder has output a bitstream using temporal layers 0, 1, and 2. Then removing all layer 2 NAL units or removing all layer 1 and 2 NAL units will result in bitstreams that can be decoded without problems. This is ensured by restrictions in the HEVC specification that the encoder must comply. For instance, it is not allowed for a picture of a temporal layer to reference a picture of a higher temporal layer.

The value of the nuh_layer_id syntax element in the NAL unit header specifies the layer ID to which the NAL unit belongs.

A layer access unit in VVC can be defined as a set of NAL units for which the VCL NAL units all have a particular value of nuh_layer_id, that are associated with each other according to a specified classification rule, that are consecutive in decoding order, and that contain exactly one coded picture.

A coded layer video sequence ("CLVS") in the current version of VVC can be defined as a sequence of layer access units that include, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated in FIG. 4. In the current version of VVC, layers may be coded independently or dependently from each other. When the layers are coded independently, a layer with nuh_layer_id 0 may not predict video data from another layer with nuh_layer_id 1. In the current version of VVC, dependent coding between layers may be used, which enables support for scalable coding with SNR, spatial and view scalability.

The current VVC draft includes a picture header, which is a NAL unit having nal_unit_type equal to PH_NUT. The picture header is similar to a slice header, but the values of the syntax elements in the picture header are used to decode all slices of one picture. Each picture in VVC includes a picture header NAL unit followed by all coded slices of the picture where each coded slice is conveyed in one coded slice NAL unit.

For single layer coding in HEVC, an access unit ("AU") can be the coded representation of a single picture. An AU can include several video coding layers ("VCL") NAL units as well as non-VCL NAL units.

An Intra random access point ("IRAP") picture in HEVC is a picture that does not refer to any pictures other than itself for prediction in its decoding process. The first picture in the bitstream in decoding order in HEVC must be an IRAP picture, however, an IRAP picture may also appear later in the bitstream. HEVC specifies three types of IRAP pictures: a broken link access ("BLA") picture, an instantaneous decoder refresh ("IDR") picture, and a clean random access ("CRA") picture.

A coded video sequence ("CVS") in HEVC is a series of access units starting at an IRAP access unit up to, but not including, the next IRAP access unit in decoding order.

IDR pictures can start a new CVS. An IDR picture may have associated random access decodable leading ("RADL") pictures. An IDR picture may not have associated RASL pictures.

BLA pictures can also start a new CVS and can have the same effect on the decoding process as an IDR picture. However, a BLA picture in HEVC may include syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded.

A CRA picture may have associated RADL or RASL pictures. As with a BLA picture, a CRA picture may include syntax elements that specify a non-empty set of reference pictures. For CRA pictures, a flag can be set to specify that the associated RASL pictures are not output by the decoder, because they may not be decodable, as they may include references to pictures that are not present in the bitstream. A CRA may or may not start a CVS.

In VVC, there is also the GRA picture which may or may not start a CVS without an Intra picture. A coded layer video sequence start ("CLVSS") picture in VVC is an IRAP picture or a GRA picture. A CLVSS picture in VVC may start a VVC coded layer video sequence ("CLVS"), which can be similar to a CVS in HEVC.

There is no BLA picture type in VVC.

HEVC specifies three types of parameter sets, the picture parameter set ("PPS"), the sequence parameter set ("SPS"), and the video parameter set ("VPS"). The PPS can include data that is common for a whole picture, the SPS can include data that is common for a coded video sequence ("CVS"), and the VPS can include data that is common for multiple CVSs.

VVC can also use these parameter set types. In VVC, there is also the adaptation parameter set ("APS") and the decoding parameter set ("DPS"). The APS can include information that can be used for multiple slices and two slices of the same picture can use different APSs. The DPS can include information specifying the "worst case" in terms of profile and level that the decoder will encounter in the entire bitstream.

The concept of slices in HEVC divides the picture into independently coded slices, where decoding of one slice in a picture is independent of other slices of the same picture. Different coding types could be used for slices of the same picture (e.g., a slice could either be an I-slice, P-slice or B-slice). One purpose of slices is to enable resynchronization in case of data loss. In HEVC, a slice can be a set of CTUs.

In the current version of VVC, a picture may be partitioned into either raster scan slices or rectangular slices. A raster scan slice can include a number of complete tiles in raster scan order. A rectangular slice can include a group of tiles that together occupy a rectangular region in the picture or a consecutive number of CTU rows inside one tile. Each slice has a slice header comprising syntax elements. Decoded slice header values from these syntax elements can be used when decoding the slice. Each slice can be carried in one VCL NAL unit.

In a previous version of the VVC draft specification, slices were referred to as tile groups.

Figure 5:
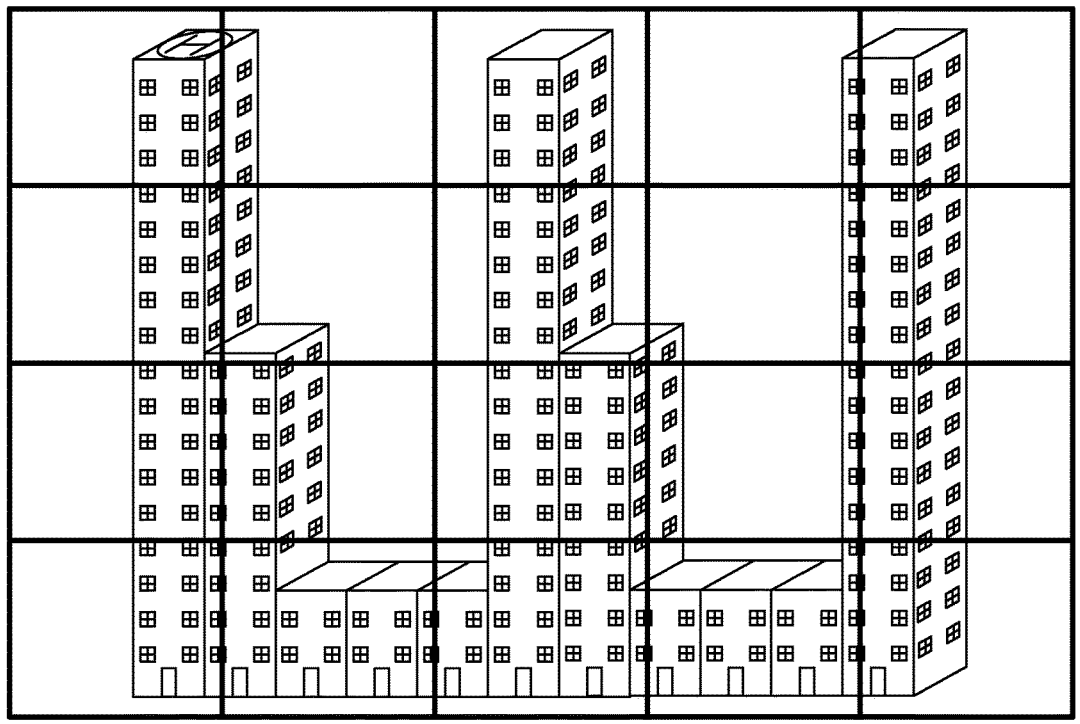
FIG. 5 is a schematic diagram illustrating an example of tile partitioning.

The draft VVC video coding standard includes a tool called tiles that divides a picture into rectangular spatially independent regions. Tiles in the draft VVC coding standard are similar to the tiles used in HEVC. Using tiles, a picture in VVC can be partitioned into rows and columns of CTUs where a tile is an intersection of a row and a column. FIG. 5 shows an example of a tile partitioning using 4 tile rows and 5 tile columns resulting in a total of 20 tiles for the picture.

The tile structure is signaled in the picture parameter set ("PPS") by specifying the thicknesses of the rows and the widths of the columns. Individual rows and columns can have different sizes, but the partitioning always span across the entire picture, from left to right, and top to bottom respectively.

There is generally no decoding dependency between tiles of the same picture. This includes intra prediction, context selection for entropy coding, and motion vector prediction. One exception is that in-loop filtering dependencies are generally allowed between tiles.

Figure 6:
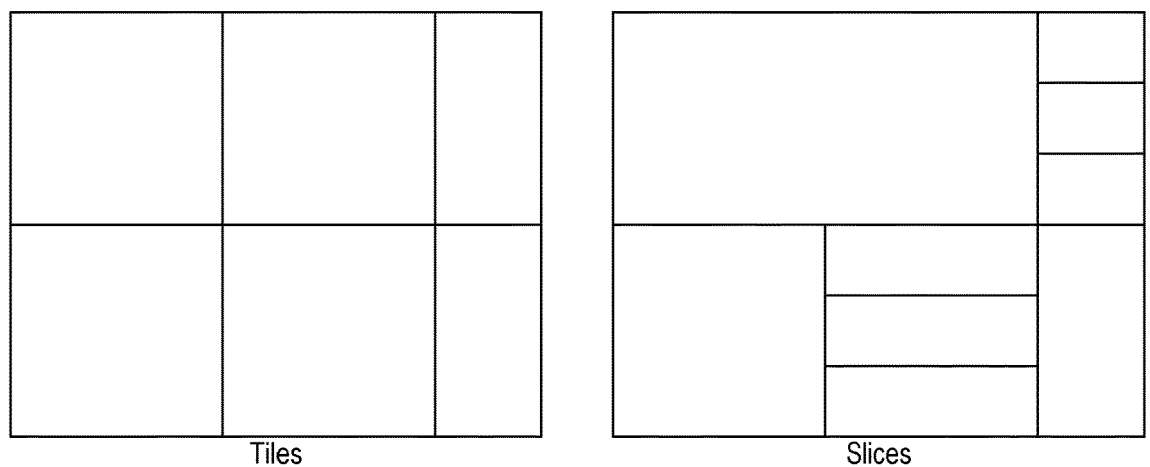
FIG. 6 is a schematic diagram illustrating an example of rectangular slice.

In the rectangular slice mode in VVC, a tile can further be split into multiple slices where each slice includes a consecutive number of CTU rows inside one tile. FIG. 6 shows an example of a tile partitioning and a rectangular slice partitioning using the tile partitioning in VVC.

Pictures in HEVC are identified by their picture order count ("POC") values, also known as full POC values. Each slice can include a code word, pic_order_cnt_lsb, that can be the same for all slices in a picture. Pic_order_cnt_lsb is also known as the least significant bits ("lsb") of the full POC since it is a fixed-length code word and only the least significant bits of the full POC is signaled. Both encoder and decoder can keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to $2^8=256$. The picture order count value of a picture is called PicOrderCntVal in HEVC. Usually, PicOrderCntVal for the current picture is simply called PicOrderCntVal. POC is expected to work in a similar way in the final version of VVC.

Figure 7:
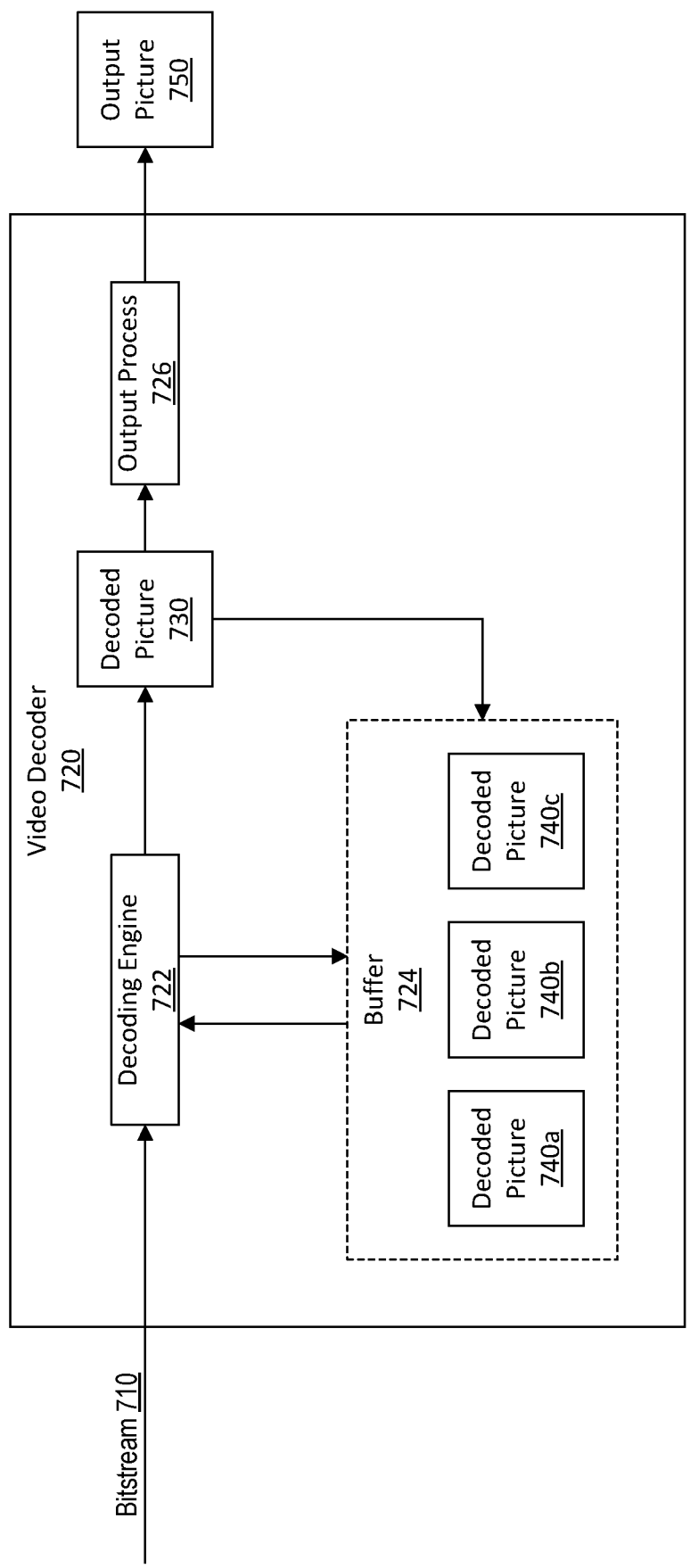
FIG. 7 is a block diagram illustrating an example of an output process.

FIG. 7 shows an output process in a decoding system. The input to the video decoder 720, the bitstream 710, is decoded by a decoding engine 722 in a decoding process to one or more decoded pictures 730. The decoded picture is finally subject to an output process 726 and output as output picture 750.

The input to the output process 726 is the decoded picture 730 and the output of the output process 726 is the output picture 750. The decoded picture 730 that is used as input to the output process 726 may be stored in the decoded picture buffer 724 and may be used in the decoding process of other, future pictures. In this example, previous decoded pictures 740a-c may have been used to by the decoding engine 722 to generate the decoded picture 730. The output picture 750 may not be identical to the decoded picture 730. In this case, the output picture 750 may be stored as a separate picture in memory.

The output process 726 may output an output picture 750 that is a modified version of the decoded picture 730 that may have been modified in a number of different ways, such as one of the following or a combination of two or more of the following:

1. Apply film grain;
2. Apply a color transform and/or color component value scaling;
3. Apply a projection mapping or inverse projection mapping such as converting the decoded picture from a cube map projection to a spherical representation or to an equirectangular representation;
4. Perform a region-wise packing or region-wise unpacking of the picture by a set of region-wise operations such as repositioning, scaling and rotation;
5. Crop the decoded picture;
6. Convert the decoded picture to a different color format such as from Rec 709 to PQ;
7. Convert the decoded picture to a different chroma format such as from YUV 4:2:0 to YUV 4:4:4;
8. Scale or resample the picture from a decoded resolution to an output resolution;
9. Convert to a different sample aspect ratio;
10. Convert two decoded fields to an interlaced picture;
11. Apply/remove frame packing;
12. Extracting one or more subpictures (similar to cropping the decoded picture but may for instance comprise merging subpictures from different locations in the picture;
13. Apply post filtering such as deblocking filtering, anti-banding filtering, anti-aliasing filtering, sharpening filtering and blurriness filtering; and
14. Apply overlays such as timed text, logos, and sport graphics.

Noise in video can originate from different sources. This noise can be suppressed by the encoder at the earliest stage of the process. When the picture is reconstructed at the decoder before display, a modeled or an unmodeled noise can be added in one way or another to the decoded frame. Different objectives have been introduced that manifests the subjective quality increase by adding noise which, as a result of increase in picture resolution, has now become more apparent. One reason to add noise is to introduce artistic effects. For example, while shooting documentaries, portraits, black and white scenes, to capture reality, or to get the "real cinema effect" for movies. Another reason to add noise is to hide coding artifacts such as blurriness, blocking and banding effects appeared due to the heavy encoding procedure in the encoder.

According to the description of the supplemental enhancement information used in the draft of the VVC standard and as specified in JVET-P2007-v3.docx, a film grain process is supported in VVC. This process is essentially identical to the film grain processes specified in the H.264/AVC and HEVC video coding standards. The process includes an SEI message that carries a parametrized model for film grain synthesis in the decoder.

The film grain characteristic SEI message includes a cancel flag, film_grain_characteristics_cancel_flag, which enables the film grain process if it is set equal to 0. Also, when the flag is set to 0, film grain parameter syntax elements follow the flag. film_grain_characteristics_persistence_flag specifies the persistence of the film grain characteristic SEI message for the current layer. FIG. 8 illustrates an example of the syntax.

In the Film Grain Technology—specification introduced in [SPMTE], a seed derivation method is specified that derives a seed value to be used for the Film grain characteristics SEI process. The seed is initialized using information that is already available at the decoder and is selected from a predetermined set of 256 possible seeds in a look-up table. For the pseudo-random number generator, and to select 8×8 blocks of samples, the seed is initialized as seed=Seed_LUT[Mod[pic_offset+color_offset[c], 256)], in which color offset[c] is equal to 0, 85 and 170 for Y, Cb and Cr channels respectively and pic_offset is defined as pic_offset=POC(curr_pic)+(POC_offset<<5)

where POC(curr_pic) is equal to the picture order count value of the current frame, and where POC_offset is set equal to the value of idr_pic_id on IDR frames, otherwise it is set equal to 0.

Moreover, the pseudo-random number generator for creation of 64×64 sample blocks is initialized as follows:

seed=Seed_LUT[$h+v*13$]

where h and v represent a value for horizontal and vertical directions respectively. Both h and v are in the range of [0,12] and determine which pattern of the film grain database is used as source of film grain samples.

Finally, in either cases, the output of Seed_LUT[.], which is the variable of the variable seed above, is used as the seed for the pseudo-random number generator. The film_grain_mode_id syntax element, the separate_colour_description_present_flag syntax element, and the syntax elements in the more_film_grain_parameters( ) structure in FIG. 8 are examples of film grain model syntax elements. The film_grain_characteristics_cancel_flag and the film_grain_characteristics_persistence_flag syntax elements may not be considered to be film grain syntax elements since they control whether or not the film grain process is enabled rather than controlling the values of the generated film grain.

The AV1 video codec format supports film grain generation. The film grain is applied when a picture is output. The sequence_header_obu( ) contains a film_grain_params_present flag that is an enable flag for the film grain signaling and process.

The film grain parameters are signaled last in the frame_header_obu( ) in a syntax table called film_grain_params( ) which is shown in FIG. 9.

In film_grain_params( ) first there is a flag, apply_grain, that controls whether film grain shall be applied to the current picture or not. Then there is a 16-bit grain_seed syntax element that is used as a seed for a pseudo-random number generator that generates the grains. The update_grain flag specifies whether film grain parameter values from a reference picture should be used, or if the film grain parameter values to use shall be decoded from the frame header. The reference picture to use is identified by the film_grain_params_ref_idx syntax element value. In FIG. 9, the frame header film grain parameters are represented by the more_film_grain_parameters( ) row to simplify the table.

The value of grain_seed initializes the seed for the pseudo-random number generator used for the Luma component of the white noise grain. For chroma components Cb and Cr, the value is modified via XOR operation as follows:

Cb_seed=grain_seed^0x$b$524

Cr_seed=grain_seed^0x49$d$8.

Figure 21:
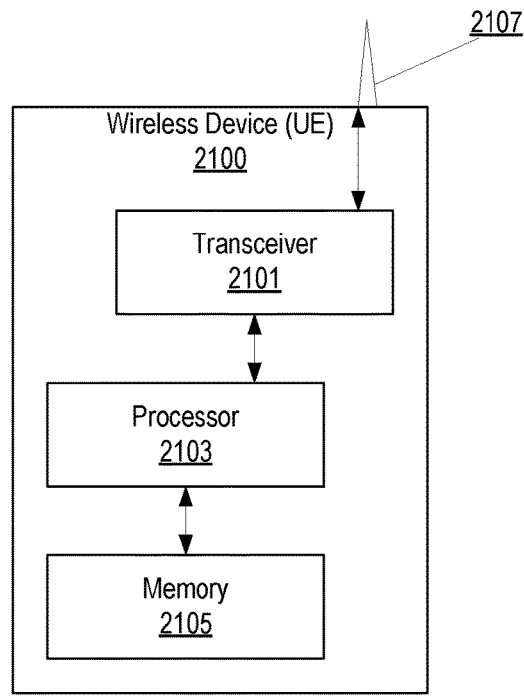
FIG. 21 is a block diagram illustrating a terminal device ("UE") according to some embodiments of inventive concepts.

FIG. 21 is a block diagram illustrating elements of a terminal device ("UE") 2100 (also referred to as a mobile terminal, a mobile communication terminal, a wireless communication device, a wireless terminal, mobile device, a wireless communication terminal, user equipment, UE, a user equipment node/terminal/device, etc.) configured to receive a coded representation of data (e.g., a bitstream or video sequence) according to embodiments of inventive concepts. As shown, the UE 2100 may include an antenna 2107 and transceiver circuitry 2101 including a transmitter and a receiver configured to provide uplink and downlink radio communications with a base station(s) (e.g., also referred to as a RAN node) of a radio access network. UE 2100 may also include processing circuitry 1803 (also referred to as a processor) coupled to the transceiver circuitry, and memory circuitry 2105 (also referred to as memory) coupled to the processing circuitry. The memory circuitry 2105 may include computer readable program code that when executed by the processing circuitry 2103 causes the processing circuitry to perform operations according to embodiments disclosed herein. According to other embodiments, processing circuitry 2103 may be defined to include memory so that separate memory circuitry is not required. UE 2100 may also include an interface (such as a user interface) coupled with processing circuitry 2103, and/or UE 2100 may be incorporated in a vehicle.

As discussed herein, operations of UE 2100 may be performed by processing circuitry 2103 and/or transceiver circuitry 2101. For example, processing circuitry 2103 may control transceiver circuitry 2101 to transmit communications through transceiver circuitry 2101 over a radio interface to a radio access network node (also referred to as a base station) and/or to receive communications through transceiver circuitry 2101 from a RAN node over a radio interface. Moreover, modules may be stored in memory circuitry 2105, and these modules may provide instructions so that when instructions of a module are executed by processing circuitry 2103, processing circuitry 2103 performs respective operations (e.g., operations discussed below with respect to Example Embodiments relating to wireless devices). In some embodiments, UE 2100 may include a display for displaying images decoded from a received bitstream. For example, UE 2100 can include a television.

Figure 22:
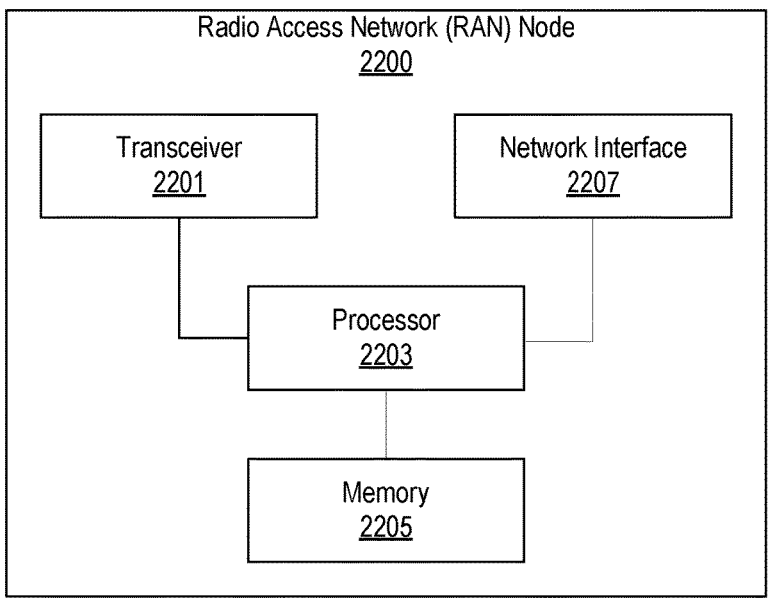
FIG. 22 is a block diagram illustrating a decoder according to some embodiments of inventive concepts.

FIG. 22 is a block diagram illustrating elements of a decoder 2200 configured to decode a bitstream according to embodiments of inventive concepts. The decoder 2200 may include network interface circuitry 2207 (also referred to as a network interface) configured to communicate with other devices. The decoder 2200 may also include processing circuitry 2203 (also referred to as a processor) coupled to memory circuitry 2205 (also referred to as memory) coupled to the processing circuitry. The memory circuitry 2205 may include computer readable program code that when executed by the processing circuitry 2203 causes the processing circuitry to perform operations according to embodiments disclosed herein. According to other embodiments, processing circuitry 2203 may be defined to include memory so that a separate memory circuitry is not required.

As discussed herein, operations of the decoder 2200 may be performed by processing circuitry 2203 and network interface 2207. For example, processing circuitry 2203 may control network interface 2207 to receive and/or transmit coded representations of data to one or more bitstream modification entities (e.g., a transcoder). Moreover, modules may be stored in memory 2205, and these modules may provide instructions so that when instructions of a module are executed by processing circuitry 2203, processing circuitry 2203 performs respective operations (e.g., operations discussed below with respect to Example Embodiments relating to decoders).

Figure 23:
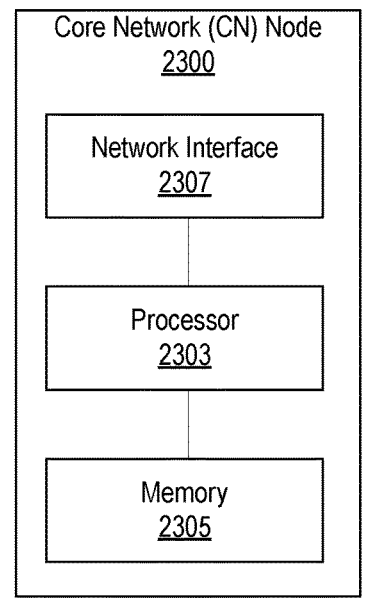
FIG. 23 is a block diagram illustrating an encoder according to some embodiments of inventive concepts.

FIG. 23 is a block diagram illustrating elements of an encoder 2300 configured to encode a bitstream according to embodiments of inventive concept. As shown, the encoder 2300 may include network interface circuitry 2307 (also referred to as a network interface) configured to communicate bitstreams with one or more other devices. The encoder 2300 may also include a processing circuitry 2303 (also referred to as a processor) coupled to the network interface circuitry, and memory circuitry 2305 (also referred to as memory) coupled to the processing circuitry. The memory circuitry 2305 may include computer readable program code that when executed by the processing circuitry 2303 causes the processing circuitry to perform operations according to embodiments disclosed herein. According to other embodiments, processing circuitry 2303 may be defined to include memory so that a separate memory circuitry is not required.

Basing the intended output video quality on an SEI message such as a film grain SEI message can be problematic since decoders are not required to implement them. This means that an encoder that considers using the film grain SEI message to improve the video quality risks the consumer being provided with a decoded video sequence without noise resulting in bad experience.

Using the film_grain_params_ref_idx method of AV1 for the VVC codec can be inefficient for a number of reasons. For example, no film grain parameters can be referred to if a picture does not use any pictures for prediction. Additionally or alternatively, film grain parameter values can not be shared between layers unless there is a reference picture in that layer that is used as a reference picture for the current picture. Additionally or alternatively, a single set of film grain parameter values may be used for a sequence of pictures, but in AV1 it is necessary to store one set of parameters for each reference picture instead of only one single set of parameters.

Using 16 bits for signaling the seed as it is done in the film grain method of AV1 is inefficient. For a 60 fps bitstream that costs close to 1 kbps which is 1% overhead for a 100 kbps bitstream.

Various embodiments described herein describe decoding film grain model syntax elements from a parameter set in the coded data representation, for example, an adaptation parameter set. A seed syntax element can also be decoded, for example, from a picture header or a slice header. The length of the seed syntax element can be configurable and decoded from a length syntax element in another parameter set. In some embodiments, the seed can be generated based on the following or a subset of the following parameter values: the decoded seed syntax element, the layer ID of the picture, the slice address of the slice, the subpicture ID of the subpicture, and an identifier value of the picture such as the least significant bits of the picture order count.

Some embodiments enable referencing a previous film grain model also for pictures that do not use any pictures for reference. Additional or alternative embodiments support sharing film grain model parameter values between pictures of different layers, both temporal sublayers and e.g. spatial scalability layers. Storing a single set of film grain parameters for a sequence of multiple pictures is also enabled. Additional or alternative embodiments provide significant bit-savings for low bitrate bitstreams where film grain models are used.

In some embodiments described below, various processes have been described. It is to be understood by a person skilled in the art that two or more embodiments, or parts of embodiments, may be combined to form new solutions which are still covered by the invention described in this disclosure. The embodiments below can be applied to a single still picture or to a video sequence of pictures. A coded data representation in these embodiments may be the same thing as a bitstream.

In some embodiments, a process of signaling film grain syntax elements in a coded picture or a coded video sequence is described. In the embodiment, there can be an assumption of a film grain model that includes: a film grain enable flag; film grain model syntax elements; one or more seed syntax elements; a seed value generating process; one or more generated seed values; and a film grain process.

Figure 10:
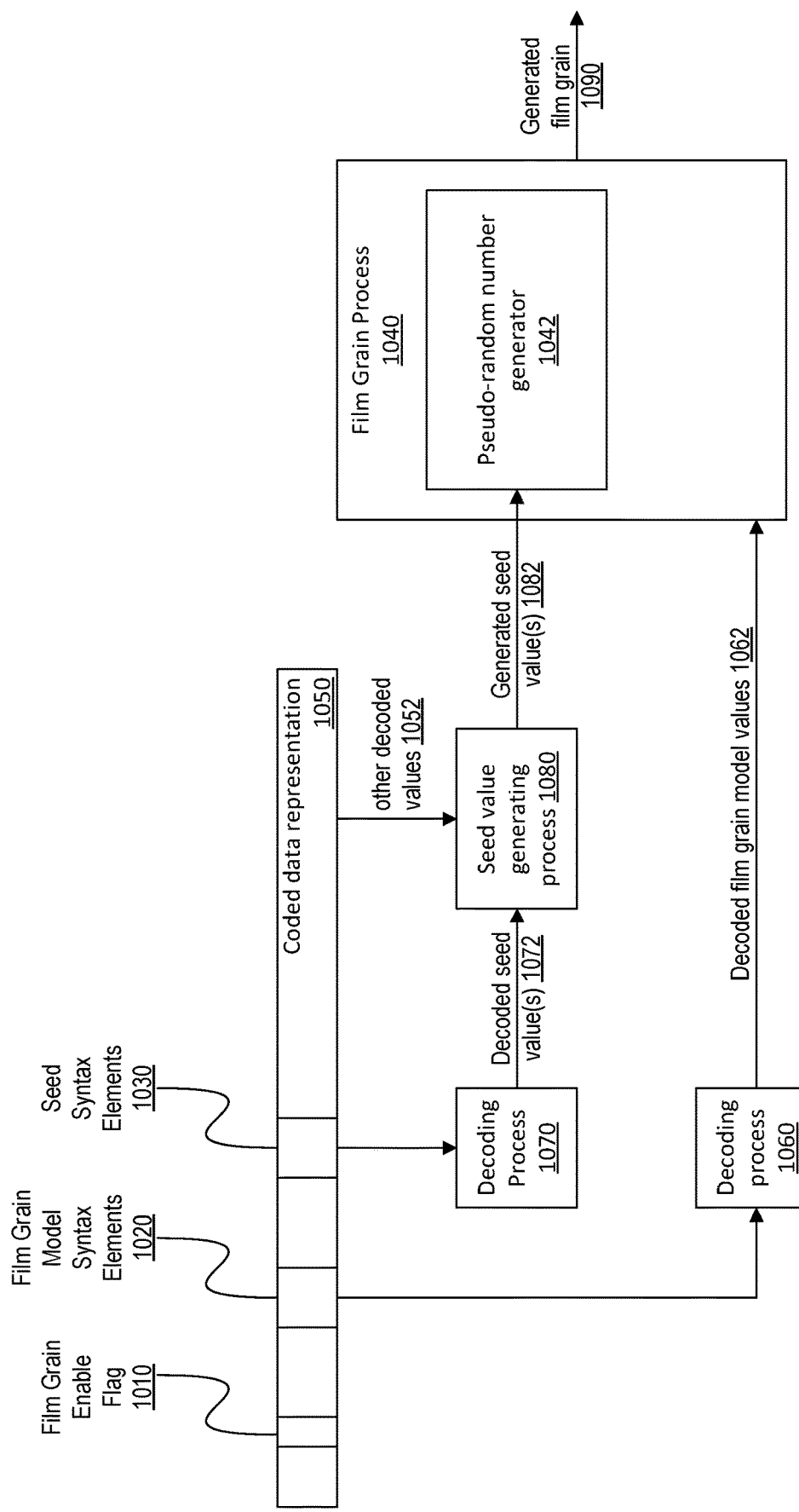
FIG. 10 is a block diagram illustrating an example of a film grain model according to some embodiments of inventive concepts.

The model can operate as illustrated in FIG. 10. A film grain enable flag 1010 can be signaled in a coded picture or video data representation such as a bitstream. One value of the flag can specify that film grain generation is enabled and another value can specify that the film grain generation is disabled. The film grain enable flag may consist of a 1 bit flag in the data representation.

One or more seed syntax elements 1030 can be signaled in a coded picture or video data representation such as a bitstream 1050. The seed syntax elements 1030 can be decoded to one or more decoded seed values 1072 in a decoding process 1070. The seed value generating process 1080 can use the decoded seed value(s) 1072 as input to generate one or more generated seed values 1082. The seed value generation process 1080 may additionally or alternatively use other decoded values 1052 as input, where the other decoded values 1052 are decoded from other syntax element in the coded data representation (e.g., bitstream 1050).

In the coded data representation 1050, there are also film grain model syntax elements 1020 that are decoded to decoded film grain model values 1062 in a decoding process 1060. The film grain process 1040 uses the generated seed value(s) 1082 and the decoded film grain model values 1062 as input to generate the generated film grain 1090. The generated film grain 1090 is preferably applied to a picture that is decoded from the coded data representation 1050. The generated film grain 1090 can be applied such that one version of the decoded picture with film grain is output by the decoder and another version of the decoded picture without film grain is stored by the decoder for inter prediction of future pictures.

The film grain process 1040 can include a pseudo-random number generator 1042 that uses the generated seed value(s) 1082 as input. The pseudo-random number generator 1042 can be initialized by the generated seed value(s) 1082 and operate in a manner such that the sequence of generated values from the pseudo-random number generator 1042 is identical if the seed value(s) used for initialization is identical. This means that the generated film grain 1090 can be fully controlled by syntax elements in the coded data representation. In some examples, the pseudo-random number generator 1042 can include a linear-feedback shift register ("LFSR"), which is a shift register whose bits is a linear function of it previous state. The initial value of the LFSR may be set equal to the generated seed value 1082.

If the film grain enable flag 1010 specifies that film grain generation is disabled, no generated film grain 1090 is applied to any picture and the film grain process 1040 is not executed. In addition, the presence of other syntax elements such as the film grain model syntax elements 1020 and the seed syntax element(s) 1030 may be conditioned on the film grain enable flag 1010 such that they are not present in the coded data representation if the flag 1010 specifies that film grain generation is disabled.

In additional or alternative embodiments, the film grain enable flag 1010 and the film grain model syntax elements 1020 are proposed to be decoded from a parameter set, such as a DPS, VPS, SPS, PPS or APS. The seed syntax element(s) 1030 are proposed to be decoded from a picture header or a slice header.

The film grain enable flag 1010 in this embodiment may be decoded from a parameter set as stated above. One example, where the film grain enable flag 1010 is decoded from the sequence parameter set (SPS) on top of the current VVC draft specification, is shown in FIG. 11.

parameter_set_film_grain_enable_flag equal to 1 specifies that film grain generation is enabled. parameter_set_film_grain_enable_flag equal to 0 specifies that film grain generation is disabled.

In another example, a no film grain constraint flag is added to the general_constraint_info( ) syntax table as shown in FIG. 12. In the current VVC draft, the general_constraint_info( ) may be present in any of the DPS, VPS, and SPS. For example, the syntax table may be present in all three parameter sets or in only the DPS, etc.

no_film_grain_constraint_flag equal to 1 specifies that parameter_set_film_grain_enabled flag shall be equal to 0. no_film_grain_constraint_flag equal to 0 does not impose such a constraint.

In another example, the no film grain constraint flag is present in the video usability information (VUI) that in the current version of VVC is conditionally signaled in the SPS.

In some embodiments, the film grain model syntax elements are decoded from the sequence parameter set (SPS). In one embodiment, as illustrated in FIG. 13, the syntax elements are decoded if the film grain enable flag specifies that film grain generation is enabled. The film grain model syntax_elements( ) line here represents the film grain model syntax elements. Note that details of the film grain model is not in the scope of this invention. Note also that this invention can be applied to many different film grain models such as for example the film grain characteristics SEI film grain model or the AV1 film grain model as described earlier. The sps_seq_parameter_set_id is a code word that specifies the ID value for the SPS.

In additional or alternative embodiments, the film grain model syntax elements are decoded from the adaptation parameter set (APS). In the syntax table illustrated in FIG. 14, the adaptation_parameter_set_id is a code word that specifies the ID value for the APS. The aps_params_type specifies what data is carried in the APS and in the example shown in FIG. 14. A value of 3 is used for film grain model syntax elements. A picture for which a film grain process is applied may identify the film grain model values to use by a film grain parameter set identifier syntax element, present in the picture header of the picture or in a slice header for a slice of the picture. The film grain model values to use are then the ones decoded from the APS that has an ID value equal to the value of the film grain parameter set identifier syntax element.

In additional or alternative embodiments, the syntax elements are decoded if the film grain enable flag specifies that film grain generation is enabled.

In some embodiments, the seed syntax element(s) are decoded from a picture header or a slice header. An example syntax is shown in FIG. 15 where the seed syntax consists of one single 8-bit syntax element.

Other signaling elements that may supplement the actual syntax conveying the seed value can include:

1. Gating the presence of the seed syntax element(s) by the film grain enable flag
2. Requiring the decoder to decode a 1-bit flag in the picture header or slice header that gates the presence of the seed syntax element(s)
3. A combination of 1 and 2 where the 1-bit flag is also gated by the film grain enable flag
4. Designing the syntax such that when a decoder decodes the seed syntax elements, it also decodes a parameter set ID specifying that the model of the parameter set having an ID value matching the value of the decoded parameter set ID value shall be used in the film grain process.

The combination of all elements 1 to 4 is shown in the table illustrated in FIG. 16. The film_grain_parameter_set_id specifies the parameter set to use and thereby what decoded film grain model values to use in the film grain process. The parameter set may here be an adaptation parameter set. In a version where film grain model syntax elements are carried in a PPS, SPS, VPS or DPS, there may not be a film_grain_parameter_set_id syntax element as shown in FIG. 16. Instead, the referred parameter set may be used, which is identified by a PPS id syntax element that is present in the picture header or the slice header, and that is not gated by any flags as shown in the syntax element table illustrated in FIG. 16 since many other decoding processes require identification of the referred parameter sets.

Note that the use of a single 8-bit syntax element to carry the seed value is an example, and other length or many other types of syntax elements such as variable length syntax elements are possible.

Figure 17:
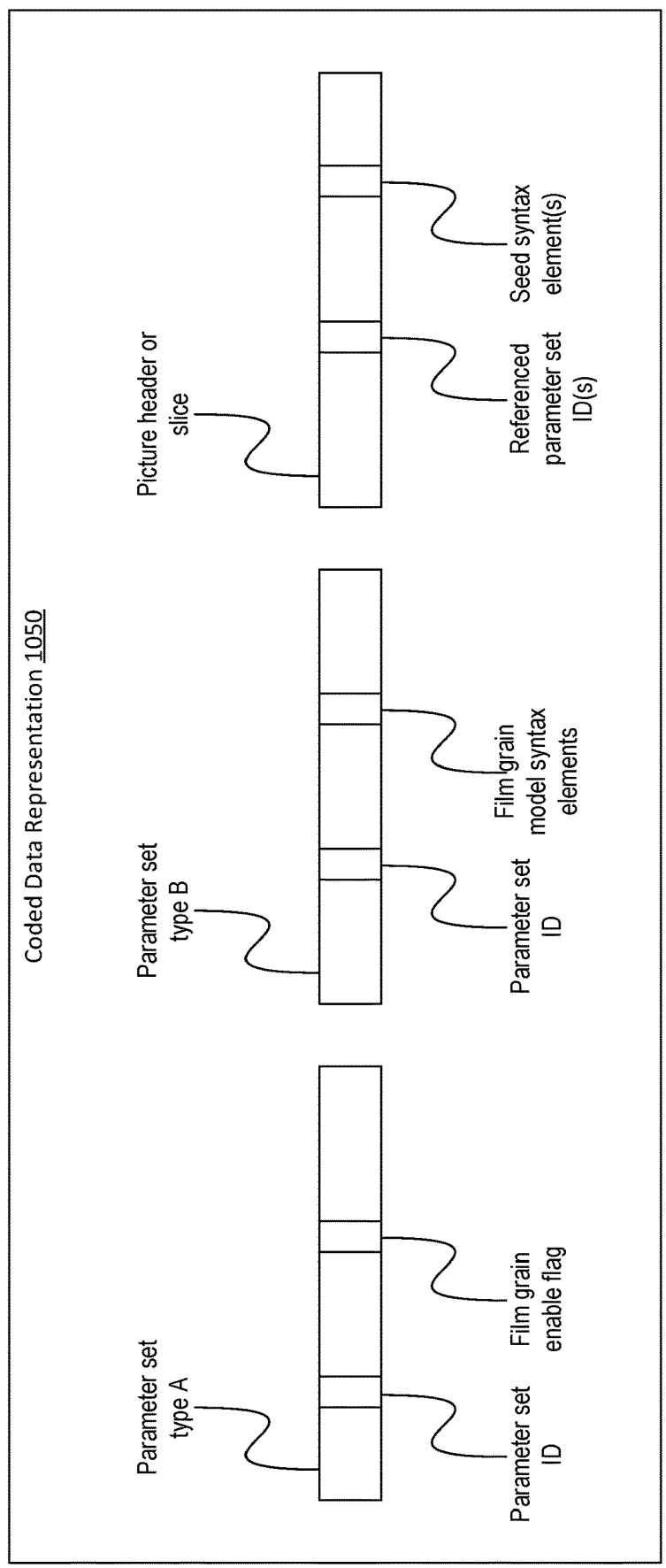
FIG. 17 is a block diagram illustrating an example of film grain syntax elements according to some embodiments of inventive concepts.

Some embodiments of the coded data representation 1050 in FIG. 10 are illustrated in FIG. 17. In these embodiments, there is one parameter set type A that carries the film grain enable flag syntax element and one parameter set type B that contains the film grain model syntax elements. Parameter set type A may be an SPS, but other placements of the film grain enable flag are possible as previously discussed. Parameter set type B may be an APS, but also here other placements are possible. In one variant of this embodiment, Parameter set types A and B are the same, for example the SPS or PPS, which means that the film grain enable flag and the film grain model syntax elements are decoded from the same parameter set. The picture header or slice contains one or more syntax elements from which one or more referenced parameter set ID values are decoded that specifies what parameter set or sets are referred for the current picture or slice, and thereby whether film grain generation is enabled and, if so, what film grain model values to use for the film grain process.

In some embodiments, although not illustrated in FIG. 17, the seed syntax elements are present in the slice and there is a picture header for the coded picture containing the slice. In this example, at least one referenced parameter set ID syntax element may be present in the picture header and used to derive what film grain model values to use for the film grain process. In case there are two or more parameter set types carrying film grain syntax elements, there may be referenced parameter set ID syntax elements in both the slice and the picture header. The slice syntax elements described here can be present and decoded from the slice header of the slice.

Some embodiments address the following issues.

First, in AV1, if a picture is all-Intra coded and does not have the type INTER_FRAME, a full set of film grain model syntax elements has to be included in the picture header if film grain generation is used for the picture. In contrast to the AV1 design, the proposed design places the film grain model syntax elements in a parameter set which means that any picture can reference a model using referenced parameter set ID syntax elements at a greatly reduced bit cost. In addition, if multiple sets of pictures share the same film grain characteristics, more than one model could efficiently be signaled in separate APSs or PPSs and each model referenced by each picture using an APS id or PPS id.

Second, in AV1, the film_grain_params_ref_idx syntax element references a reference picture. Using that design, there may be pictures belonging to a higher layer that can not reference a model used for a previous picture belonging to a different, lower layer. By placing the model in parameter set as proposed, a very flexible model referencing support is provided. Consider FIG. 18 where an access unit is a part of the bitstream containing one picture and the associated parameter sets. The first access unit consists of one parameter set with a parameter set ID value equal to 7 signaled in a syntax element. The layer ID of the parameter set is equal to 0 and that value is also signaled in a syntax element in the parameter set. All three pictures in the figure use the parameter set since they all contain a syntax element with a value of 7 that specifies that the picture uses the parameter set with an ID value equal to 7. Each picture then belong to different layers. All pictures may use the parameter set in spite of the parameter set belonging to a different layer since the layer ID of the parameter set is equal or lower than the layer ID of the pictures. This is the case both for temporal sublayer IDs as well as layer IDs such as e.g. spatial scalability layers.

Third, by using the proposed method, a minimum number of film grain models need to be stored in the decoder. For example, if we assume that one model is used and the number of reference pictures that a current picture uses is equal to n, the AV1 method requires n models to be stored while, with the proposed method, only one model stored in one parameter set is necessary.

In some embodiments, a decoder may perform all or a subset of the following operations for decoding and outputting a picture from a coded data representation. First, the decoder can decode a film grain enable flag from a parameter set. Second, the decoder can decode film grain model syntax elements from a parameter set and derives decoded film grain model values. Third, the decoder can decode one or more seed syntax elements from a picture header of a current picture into one or more decoded seed values. Fourth, the decoder can derive generated seed values based on the decoded seed values. Fifth, the decoder can decode a current picture from the coded data representation. Sixth, the decoder can use the decoded seed values or the generated seed values to initialize a pseudo-random number generator that is used in a film grain generation process performed by the decoder that applies film grain to the decoded current picture. Seventh, the decoder can output the current picture.

In additional or alternative embodiments, a decoder may perform all or a subset of the following operations for decoding and outputting a picture from a coded data representation. First, the decoder can decode a film grain enable flag from a parameter set. Second, the decoder can decode film grain model syntax elements from a parameter set and derives decoded film grain model values. Third, the decoder can decode one or more seed syntax elements from a first slice header of a first slice of a current picture into one or more first decoded seed values. Fourth, the decoder can derive first generated seed values based on the first decoded seed values. Fifth, the decoder can decode a first current slice from the coded data representation. Sixth, the decoder can use the first decoded seed values or the first generated seed values to initialize a pseudo-random number generator that is used in a film grain generation process performed by the decoder that applies film grain to the first decoded current slice. Seventh, the decoder can decode one or more seed syntax elements from a second slice header of a second slice of a current picture into one or more second decoded seed values. Eighth, the decoder can derive second generated seed values based on the second decoded seed values. Ninth, the decoder can decode a second current slice from the coded data representation. Tenth, the decoder can use the second decoded seed values or the second generated seed values to initialize a pseudo-random number generator that is used in a film grain generation process performed by the decoder that applies film grain to the second decoded current slice. Eleventh, the decoder can output the picture containing the first decoded current slice and the second decoded current slice.

In additional or alternative embodiments, a slice may be any segment of a picture, such as subpicture, tile group, tile, etc. A slice may be a part of a picture or a full picture.

In some embodiments, the number of bits to use for the seed syntax element(s) is configurable. The number of bits can be used to decode from one syntax element in a parameter set such as a DPS, VPS, SPS, PPS or APS as shown in the syntax and semantics below. There is one syntax element in a parameter set that is decoded to a length value that in turn is used to derive the number of bits to use for the seed syntax element(s).

Figures 18, 19, 20:
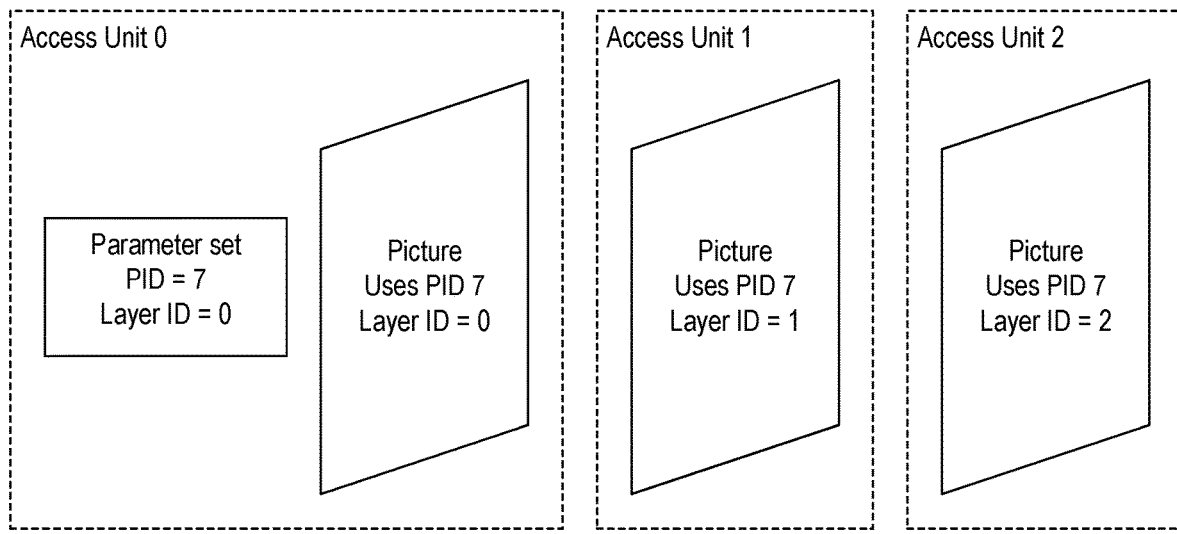
FIG. 18 is a block diagram illustrating an example of multi-layer bitstream according to some embodiments of inventive concepts.
FIG. 19 is a table illustrating an example of seed length in parameter set according to some embodiments of inventive concepts.
FIG. 20 is a table illustrating an example of variable length seed syntax according to some embodiments of inventive concepts.

FIG. 19 illustrates seed length in parameter set. film_grain_seed_len_minus1 plus 1 specifies the length, in bits, of the film_grain_seed syntax element.

FIG. 20 illustrates variable length seed syntax. film_grain_seed specifies the film grain seed value to use. The length of film_grain_seed is equal to film_grain_seed_len_minus1+1.

In some embodiments, a decoder may perform all or a subset of the following operations for decoding a picture from a coded data representation. First, the decoder can decode a length syntax element from a coded data representation. Second, the decoder can derive a length value L from the decoded value of the length syntax element. Third, the decoder can decode a seed syntax element from either a picture header of a current picture or from a slice header of a current picture into a decoded seed value, wherein the seed syntax element consists of L number of bits. Fourth, the decoder can derive a generated seed value based on the decoded seed value. Fifth, the decoder can decode a current picture from the coded data representation. Sixth, the decoder can use the decoded seed value or the generated seed value to initialize a pseudo-random number generator that is used in a film grain generation process performed by the decoder that applies film grain to the decoded current picture. Seventh, the decoder can output the current picture.

One advantage of a configurable seed size is to provide a trade-off between bit cost and the number of unique seed values that can be expressed. A problem with too few unique seed values is that the generated noise may be repeated between pictures. In some examples, an encoder may be using eight seed values such that the seed for a current picture is the same as the seed used for the pictures encoded eight pictures earlier. If temporal scalability is used such that only every eighth picture is output, the film grain noise applied on consecutively output picture may be identical which might be visible on low textured picture areas. To avoid such undesirable effects, a larger number of unique seed values can be used. Alternatively, if such temporal scalability is not provided, using eight unique seed values might be sufficient, and in some examples even fewer than eight can be used.

In additional or alternative embodiments, pictures are classified to picture types such as a picture of a certain layer. In additional or alternative embodiments, there is separate syntax elements for each picture type or each group of picture types that are used to derive a length value L for that picture type or group of picture types. In one variant length value L is derived based on the length syntax elements and the type of the current picture. One example of this latter variant is to decode one length syntax element, and derive the length value L1 for a picture belonging to a higher temporal sub-layer or layer and derive a length value L2 for a picture belonging to a lower temporal sub-layer or layer such that L2 is different than L1.

In some examples, 16 bits for signaling the seed can be used. As stated earlier that corresponds to 1% bit cost for a 100 kbps 60 fps bitstream. If a seed length of 4 bits is used instead, 0.75% bitrate reduction is achieved which is significant.

In some embodiments, a seed value generating process is performed by the decoder. As explained earlier, the seed value generating process takes decoded seed value(s) and other decoded values as input and outputs generated seed value(s).

In some embodiments, a generated seed value G can be derived as:

$$G=(O<<n)+D$$

where O is a value derived from the other decoded values, n is the number of bits used for a seed syntax element and D is the value of the decoded seed syntax element. For instance, if the derived value from the other decoded values is equal to 10, the number of bits used for the seed syntax element is equal to 4 and the bit values of the seed syntax element are equal to 9 (which is 1001 in binary format), the value of the generated seed value G is equal to (10<<4)+9=169

In additional or alternative embodiments, the value of O is based on a layer ID, such that the generated seed for a picture A and a picture B differ when picture A and B use an identical decoded seed value if the layer ID for picture A and B differ.

In additional or alternative embodiments, the value of O is based on a temporal sublayer ID, such that the generated seed for a picture A and a picture B differ when picture A and B use an identical decoded seed value if the temporal sublayer ID for picture A and B differ.

In additional or alternative embodiments, the value of O is based on a slice address such that the generated seed for a picture A and a picture B differ when picture A and B use an identical decoded seed value if the slice address value for picture A and B differ.

In additional or alternative embodiments, the value of O is based on a slice type such that the generated seed for a picture A and a picture B differ when picture A and B use an identical decoded seed value if the slice type value for picture A and B differ.

In additional or alternative embodiments, the value of O is based on a subpicture ID value such that the generated seed for a picture A and a picture B differ when picture A and B use an identical decoded seed value if the subpicture ID values for picture A and B differ.

In additional or alternative embodiments, the value of O is based on a (delta coded) quantization parameter value present in e.g. the slice header or the picture header, such that the generated seed for a picture A and a picture B differ when picture A and B use an identical decoded seed value if the (delta coded) quantization parameter value for picture A and B differ.

In additional or alternative embodiments, the number of bits used for the seed syntax element is equal to 0 which means that there is no signaled seed in the picture header or slice header of the picture or slice. In this case, the decoded seed value is considered identical for all pictures A and B discussed above.

In some embodiments, the number of bits used for the seed syntax element is variable. In the case that the seed syntax element is specified as using 0 bits, the generated seed value can be derived from the other decoded values only.

In some embodiments, a decoder may perform all or a subset of the following operations for decoding a picture from a coded data representation. First, the decoder can decode a length syntax element from a coded data representation. Second, the decoder can derive a length value L from the decoded length syntax element. Third, the decoder can decode a seed syntax element from either a picture header of a current picture or from a slice header of a current picture into a decoded seed value, wherein the seed syntax element consists of L number of bits. Fourth, the decoder can derive a generated seed value as equal to (O<<L)+D wherein O is a value derived from a first set of decoded syntax elements in the coded data representation and D is the decoded seed value. Fifth, the decoder can decode a current picture from the coded data representation. Sixth, the decoder can use the generated seed value to initialize a pseudo-random number generator that is used in a film grain generation process performed by the decoder that applies film grain to the decoded current picture. Seventh, the decoder can output the current picture.

In some embodiments, the first set of decoded syntax elements may include a subset of the following syntax elements: the seed syntax element; the layer ID of the picture; the temporal sublayer ID of the picture, a slice type value, a quantization parameter value, the slice address of the slice; the subpicture ID of the subpicture; and an identifier value of the picture such as the least significant bits of the picture order count of the current picture.

In some embodiments, a method for decoding and outputting a picture from a coded data representation is provided. The method can include obtaining film grain model syntax elements from a parameter set in the coded data representation; deriving decoded film grain model values by decoding the film grain model syntax elements; obtaining a seed syntax element from the coded data representation; deriving a generated seed value by decoding the seed syntax element; decoding a current picture from the coded data representation; generating film grain values from a pseudo-random number generator wherein the pseudo-random number generator is initialized by the generated seed value; applying the generated film grain values on the current picture; and outputting the current picture In additional or alternative embodiments, decoding the current picture from the coded data representation includes decoding a first picture from the coded data representation. Applying the generated film grain values on the current picture includes applying the generated film grain values on the first picture to obtain a second picture that contains film grain. Outputting the current picture includes outputting the second picture. The first picture is stored in a decoded picture buffer. A third picture is decoded from the coded data representation wherein the stored first picture is used for inter prediction in the decoding process of the third picture In additional or alternative embodiments, the seed syntax element is obtained from a picture header or slice header in the coded data representation In additional or alternative embodiments, the film grain model syntax elements are obtained from a sequence parameter set In additional or alternative embodiments, the film grain model syntax elements are obtained from an adaptation parameter set wherein the adaptation parameter set includes one adaptation_parameter_set_id syntax element and one parameter set type syntax element having a value equal to a film grain type value, and the picture header or slice header includes a film_grain_parameter_set_id syntax element having a value equal to the value of the adaptation_parameter_set_id syntax element.

In some embodiments, a method for decoding and outputting a picture from a coded data representation is provided. The method can include obtaining film grain model syntax elements from the coded data representation; deriving decoded film grain model values by decoding the film grain model syntax elements; obtaining a film grain seed length syntax element from the coded data representation; deriving a film grain seed length value L1 by decoding the film grain seed length syntax element; obtaining a seed syntax element from the coded data representation wherein the seed syntax element comprises exactly L1 bits; deriving a generated seed value by decoding the seed syntax element; decoding a current picture from the coded data representation; generating film grain values from a pseudo-random number generator wherein the pseudo-random number generator is initialized by the generated seed value; applying the generated film grain values on the current picture; and outputting the current picture.

In additional or alternative embodiments, decoding the current picture from the coded data representation includes decoding a first picture from the coded data representation. Applying the generated film grain values on the current picture includes applying the generated film grain values on the first picture to obtain a second picture that contains film grain. Outputting the current picture includes outputting the second picture. The first picture can be stored in a decoded picture buffer. A third picture can be decoded from the coded data representation wherein the stored first picture is used for inter prediction in the decoding process of the third picture In additional or alternative embodiments, deriving a generated seed value by decoding the seed syntax element comprises deriving the generated seed value as equal to (O<<L1)+D wherein O is a value derived from a first set of decoded syntax elements in the coded data representation and D is the value of the decoded seed syntax element.

Figure 25:
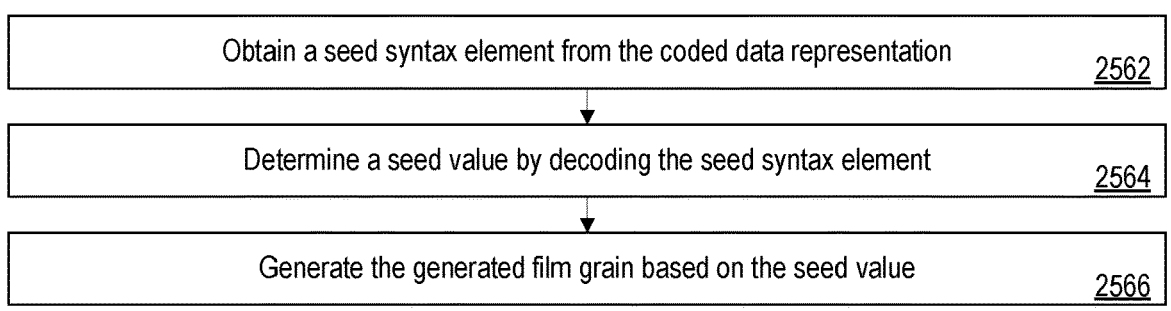
Figure 26:
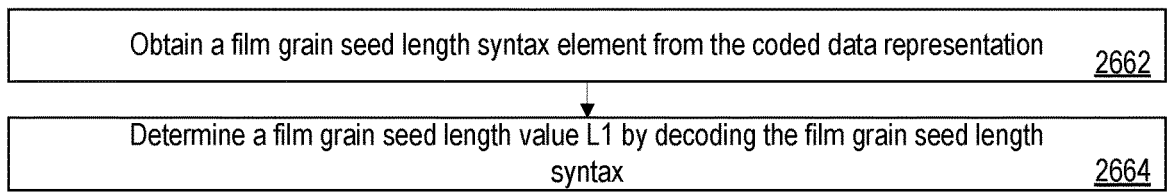

In additional or alternative embodiments, the first set of decoded syntax elements includes a subset of the following syntax elements: the decoded seed syntax element; the layer ID of the picture; the slice address of the slice; the subpicture ID of the subpicture; and an identifier value of the picture such as the least significant bits of the picture order count Operations of a decoder 2200 (implemented using the structure of FIG. 21) will now be discussed with reference to the flow charts of FIG. 24-26 according to some embodiments of inventive concepts. For example, modules may be stored in memory 2205 of FIG. 22, and these modules may provide instructions so that when the instructions of a module are executed by respective decoder processing circuitry 2203, processing circuitry 2203 performs respective operations of the flow chart. Although FIGS. 24-26 are described below in regards to decoder 2200, the operations in FIGS. 24-26 can be performed by any suitable bitstream modification entity, for example, encoder 2300.

Figure 24:
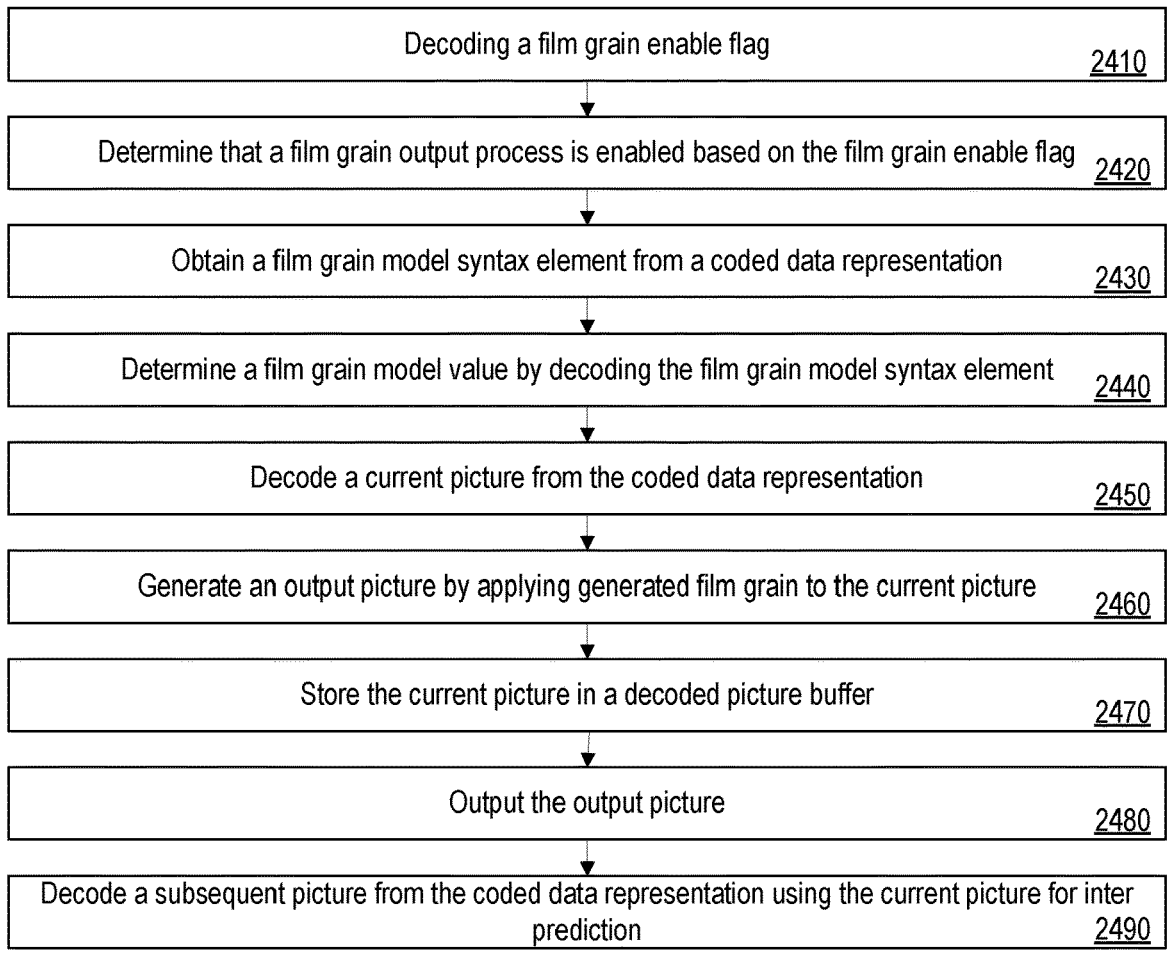
FIGS. 24-26 are flow charts illustrating examples of operations of a decoder or encoder according to some embodiments of inventive concepts.

In FIG. 24, at block 2410, processing circuitry 2203 decodes a film grain enable flag.

At block 2420, processing circuitry 2203 determines that a film grain output process is enabled based on the film grain enable flag.

At block 2430, processing circuitry 2203 obtains a film grain model syntax element from a coded data representation. In some embodiments, obtaining the film grain model syntax element from the parameter set in the coded data representation is in response to determining that the film grain output process is enabled.

At block 2440, processing circuitry 2203 determines a film grain model value by decoding the film grain model syntax element.

At block 2450, processing circuitry 2203 decodes a current picture from the coded data representation.

At block 2460, processing circuitry 2203 generates an output picture by applying generated film grain to the current picture.

FIGS. 25-26 depict examples of generating the generated film grain.

In FIG. 25, at block 2562, processing circuitry 2203 obtains a seed syntax element from the coded data representation. In some embodiments, obtaining the seed syntax element from the coded data representation includes obtaining the seed syntax element from a picture header or a slice header in the coded data representation. In additional or alternative embodiments, obtaining the film grain model syntax element from the parameter set in the coded data representation can include obtaining the film grain model syntax element from an adaptation parameter set, APS. The APS can include an APS set identifier syntax element and a parameter set type syntax element comprising a value equal to a film grain type value. The picture header or slice header can include a film grain parameter set identifier syntax element comprising a value equal to the value of the APS set identifier syntax element.

At block 2564, processing circuitry 2203 determines a seed value by decoding the seed syntax element.

At block 2566, processing circuitry 2203 generates the generated film grain based on the seed value. In some embodiments, the generated film grain is generated from a number generator (e.g., a linear-feedback shift register).

In FIG. 26, at block 2662, processing circuitry 2203 obtains a film grain seed length syntax element from the coded data representation. At block 2664, processing circuitry 2203 determines a film grain seed length value L1 by decoding the film grain seed length syntax. In some embodiments, determining the seed value by decoding the seed syntax element includes determining the seed value is (O<<L1)+D. O can be a value derived from a first set of decoded syntax elements in the coded data representation and D can be the value of the seed syntax element. In additional or alternative embodiments, the first set of decoded syntax elements comprises at least one of: the seed syntax element; a layer ID of the current picture; a temporal sublayer ID of the current picture; a slice type value; a quantization parameter value; a slice address of a slice of the current picture; a subpicture ID of a subpicture of the current picture; and an identifier value of the current picture such as the least significant bits of the picture order count of the current picture.

Returning to FIG. 24, at block 2470, processing circuitry 2203 store the current picture in a decoded picture buffer.

At block 2480, processing circuitry 2203 outputs the output picture.

At block 2490, processing circuitry 2203 decodes a subsequent picture from the coded data representation using the current picture for inter prediction. In some embodiments, the subsequent picture is decoded subsequent to generating the output picture.

Various operations from the flow chart of FIG. 24 may be optional with respect to some embodiments of decoders, encoders, and related methods. Regarding methods of example embodiment 1 (set forth below), for example, operations of blocks 2410, 2420, 2470, and 2490 of FIG. 24 may be optional. Regarding methods of example embodiment 11 (set forth below), for example, operations of blocks 2410, 2420, 2470, and 2490 of FIG. 24 may be optional.

Example embodiments are discussed below.

Embodiment 1. A method performed by a decoder, the method comprising:
  obtaining (2430) a film grain model syntax element from a parameter set in a coded data representation;
  determining (2440) a film grain model value by decoding the film grain model syntax element;
  decoding (2450) a current picture from the coded data representation;
  generating (2460) an output picture by applying generated film grain to the current picture; and
  outputting (2480) the output picture.

Embodiment 2. The method of Embodiment 1, further comprising:
  storing (2470) the current picture in a decoded picture buffer, DPB; and
  decoding (2490) a subsequent picture from the coded data representation using the current picture for inter prediction, the subsequent picture being decoded subsequent to generating the output picture.

Embodiment 3. The method of any of Embodiments 1-2, further comprising:
  obtaining (2562) a seed syntax element from the coded data representation;
  determining (2564) a seed value by decoding the seed syntax element; and
  generating (2566) the generated film grain from a number generator based on the seed value.

Embodiment 4. The method of Embodiment 3, wherein the number generator comprises a linear-feedback shift register.

Embodiment 5. The method of any of Embodiments 3-4, wherein obtaining the seed syntax element from the coded data representation comprises obtaining the seed syntax element from a picture header or a slice header in the coded data representation.

Embodiment 6. The method of Embodiment 5 wherein obtaining the film grain model syntax element from the parameter set in the coded data representation comprises obtaining the film grain model syntax element from an adaptation parameter set, APS, the APS comprising:
  an APS set identifier syntax element; and
  a parameter set type syntax element comprising a value equal to a film grain type value, and
  wherein the picture header or slice header comprises a film grain parameter set identifier syntax element comprising a value equal to the value of the APS set identifier syntax element.

Embodiment 7. The method of any of Embodiments 3-6, further comprising:

obtaining (2662) a film grain seed length syntax element from the coded data representation; and determining (2664) a film grain seed length value L1 by decoding the film grain seed length syntax, wherein the seed syntax element comprises L1 bits.

Embodiment 8. The method of Embodiment 7, wherein determining the seed value by decoding the seed syntax element comprises determining the seed value is (O<<L1)+ D, wherein O is a value derived from a first set of decoded syntax elements in the coded data representation, and wherein D is the value of the seed syntax element.

Embodiment 9. The method of Embodiment 8, wherein the first set of decoded syntax elements comprises at least one of:

the seed syntax element;
a layer ID of the current picture;
a temporal sublayer ID of the current picture;
a slice type value;
a quantization parameter value;
a slice address of a slice of the current picture;
a subpicture ID of a subpicture of the current picture; and
an identifier value of the current picture such as the least significant bits of the picture order count of the current picture.

Embodiment 10. The method of Embodiments 1-9, further comprising:

decoding (2410) a film grain enable flag from the parameter set; and determining (2420) that a film grain output process is enabled based on the film grain enable flag, wherein obtaining the film grain model syntax element from the parameter set in the coded data representation is in response to determining that the film grain output process is enabled.

Embodiment 11. A method performed by an encoder, the method comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 12. The method of Embodiment 11, further comprising:

obtaining (2562) a seed syntax element from the coded data representation;

determining (2564) a seed value by decoding the seed syntax element; and generating (2566) the generated film grain from a number generator based on the seed value.

Embodiment 13. The method of Embodiment 12, wherein the number generator comprises a linear-feedback shift register.

Embodiment 14. The method of any of Embodiments 12-13, wherein obtaining the seed syntax element from the coded data representation comprises obtaining the seed syntax element from a picture header or a slice header in the coded data representation.

Embodiment 15. The method of any of Embodiments 12-14, further comprising:

obtaining (2662) a film grain seed length syntax element from the coded data representation; and determining (2664) a film grain seed length value L1 by decoding the film grain seed length syntax, wherein the seed syntax element comprises L1 bits.

Embodiment 16. The method of Embodiment 15, wherein determining the seed value by decoding the seed syntax element comprises determining the seed value is (O<<L1)+ D, wherein O is a value derived from a first set of decoded syntax elements in the coded data representation, and wherein D is the value of the seed syntax element.

Embodiment 17. A decoder (2200) is provided, the decoder comprising:

processing circuitry (2203);

memory (2205) coupled with the processing circuitry, wherein the memory includes instructions that when executed by the processing circuitry causes the decoder to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 18. The decoder of Embodiment 17, the operations further comprising any of the operations of Embodiments 2-10.

Embodiment 19. An encoder (2300) is provided, the encoder comprising:

processing circuitry (2303);

memory (2305) coupled with the processing circuitry, wherein the memory includes instructions that when executed by the processing circuitry causes the encoder to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 20. The encoder of Embodiment 19, the operations further comprising any of the operations of Embodiments 11-16.

Embodiment 21. A computer program comprising program code to be executed by a decoder (2200) to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 22. The computer program of Embodiment 21, the operations further comprising any of the operations of Embodiments 2-10.

Embodiment 23. A computer program comprising program code to be executed by an encoder (2300) to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 24. The computer program of Embodiment 23, the operations further comprising any of the operations of Embodiments 11-16.

Embodiment 25. A computer program product comprising a non-transitory storage medium (2205) including program code to be executed by processing circuitry (2203) of a decoder (2200), whereby execution of the program code causes the decoder to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 26. The computer program product of Embodiment 25, the operations further comprising any of the operations of Embodiments 2-10.

Embodiment 27. A computer program product comprising a non-transitory storage medium (2305) including program code to be executed by processing circuitry (2303) of an encoder (2300), whereby execution of the program code causes the encoder to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 28. The computer program product of Embodiment 27, the operations further comprising any of the operations of Embodiments 11-16.

Embodiment 29. A non-transitory computer-readable medium having instructions stored therein that are executable by processing circuitry (2203) to cause a decoder (2200) to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 30. The non-transitory computer-readable medium of Embodiment 29, the operations further comprising any of the operations of Embodiments 2-10.

Embodiment 31. A non-transitory computer-readable medium having instructions stored therein that are executable by processing circuitry (2303) to cause an encoder (2300) to perform operations comprising:

obtaining (2430) a film grain model syntax element from a parameter set in a coded data representation;

determining (2440) a film grain model value by decoding the film grain model syntax element;

decoding (2450) a current picture from the coded data representation;

generating (2460) an output picture by applying generated film grain to the current picture; and outputting (2480) the output picture.

Embodiment 32. The non-transitory computer-readable medium of Embodiment 31, the operations further comprising any of the operations of Embodiments 11-16.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a decoder for decoding encoded pictures, the method comprising:
    obtaining a film grain model syntax element from an adaptation parameter set, APS, in a coded data representation;
    determining a film grain model value by decoding the film grain model syntax element;
    obtaining a seed syntax element from a picture header or a slice header of the coded data representation;
    determining a seed value by decoding the seed syntax element;
    decoding a current picture from the coded data representation;
    generating film grain from a number generator based on the seed value;
    generating an output picture by applying the generated film grain to the current picture; and
    outputting the output picture,
    wherein the APS comprises an APS set identifier syntax element and an APS type syntax element comprising a value equal to a film grain type value, and
    wherein the picture header or slice header comprises a film grain parameter set identifier syntax element comprising a value equal to the value of the APS set identifier syntax element.

2. The method of claim 1, further comprising:
    storing the current picture in a decoded picture buffer, DPB; and
    decoding a subsequent picture from the coded data representation using the current picture for inter prediction, the subsequent picture being decoded subsequent to generating the output picture.

3. The method of claim 1, wherein the number generator comprises a linear-feedback shift register.

4. The method of claim 1, further comprising:
    obtaining a film grain seed length syntax element from the coded data representation; and
    determining a film grain seed length value L1 by decoding the film grain seed length syntax, wherein the seed syntax element comprises L1 bits.

5. The method of claim 4, wherein determining the seed value by decoding the seed syntax element comprises determining the seed value is $(O<<L1)+D$,
    wherein O is a value derived from a first set of decoded syntax elements in the coded data representation, and
    wherein D is the value of the seed syntax element.

6. The method of claim 5, wherein the first set of decoded syntax elements comprises at least one of:
    the seed syntax element;
    a layer ID of the current picture;
    a temporal sublayer ID of the current picture;
    a slice type value;
    a quantization parameter value;
    a slice address of a slice of the current picture;
    a subpicture ID of a subpicture of the current picture; and
    an identifier value of the current picture such as the least significant bits of the picture order count of the current picture.

7. The method of claim 1, further comprising:
    decoding a film grain enable flag from the parameter set; and determining that a film grain output process is enabled based on the film grain enable flag,
wherein obtaining the film grain model syntax element from the parameter set in the coded data representation is in response to determining that the film grain output process is enabled.

8. A method performed by an encoder for encoding pictures, the method comprising:
obtaining a film grain model syntax element from an adaptation parameter set, APS, in a coded data representation;
determining a film grain model value by decoding the film grain model syntax element;
obtaining a seed syntax element from a picture header or a slice header of the coded data representation;
determining a seed value by decoding the seed syntax element;
decoding a current picture from the coded data representation;
generating film grain from a number generator based on the seed value;
generating an output picture by applying the generated film grain to the current picture; and
outputting the output picture,
wherein the APS comprises an APS set identifier syntax element and an APS type syntax element comprising a value equal to a film grain type value, and
wherein the picture header or slice header comprises a film grain parameter set identifier syntax element comprising a value equal to the value of the APS set identifier syntax element.

9. The method of claim 8, wherein the number generator comprises a linear-feedback shift register.

10. The method of claim 8, further comprising:
obtaining a film grain seed length syntax element from the coded data representation; and
determining a film grain seed length value L1 by decoding the film grain seed length syntax,
wherein the seed syntax element comprises L1 bits.

11. The method of claim 10, wherein determining the seed value by decoding the seed syntax element comprises determining the seed value is (O<<L1)+D,
wherein O is a value derived from a first set of decoded syntax elements in the coded data representation, and
wherein D is the value of the seed syntax element.

12. A decoder for decoding encoded pictures, the decoder comprising:
processing circuitry;
memory coupled with the processing circuitry, wherein the memory includes instructions that when executed by the processing circuitry causes the decoder to perform operations comprising:
obtaining a film grain model syntax element from an adaptation parameter set, APS, in a coded data representation;
determining a film grain model value by decoding the film grain model syntax element;
obtaining a seed syntax element from a picture header or a slice header of the coded data representation;
determining a seed value by decoding the seed syntax element;
decoding a current picture from the coded data representation;
generating film grain from a number generator based on the seed value;
generating an output picture by applying generated film grain to the current picture; and
outputting the output picture,
wherein the APS comprises an APS set identifier syntax element and an APS type syntax element comprising a value equal to a film grain type value, and
wherein the picture header or slice header comprises a film grain parameter set identifier syntax element comprising a value equal to the value of the APS set identifier syntax element.

13. An encoder for encoding pictures is provided, the encoder comprising:
processing circuitry;
memory coupled with the processing circuitry, wherein the memory includes instructions that when executed by the processing circuitry causes the encoder to perform operations comprising:
obtaining a film grain model syntax element from an adaptation parameter set, APS, in a coded data representation;
determining a film grain model value by decoding the film grain model syntax element;
obtaining a seed syntax element from a picture header or a slice header of the coded data representation;
determining a seed value by decoding the seed syntax element;
decoding a current picture from the coded data representation;
generating film grain from a number generator based on the seed value;
generating an output picture by applying the generated film grain to the current picture; and
outputting the output picture,
wherein the APS comprises an APS set identifier syntax element and an APS type syntax element comprising a value equal to a film grain type value, and
wherein the picture header or slice header comprises a film grain parameter set identifier syntax element comprising a value equal to the value of the APS set identifier syntax element.

* * * * *